United States Patent [19]
Tian

[11] Patent Number: 5,967,413
[45] Date of Patent: Oct. 19, 1999

[54] DAMPED SOLENOID ACTUATED VALVE AND FUEL INJECTOR USING SAME

[75] Inventor: Steven Y. Tian, Bloomington, Ill.

[73] Assignee: Caterpillar Inc., Peoria, Ill.

[21] Appl. No.: 09/022,152

[22] Filed: Feb. 11, 1998

[51] Int. Cl.$^6$ .......................... F02M 47/04; F02M 51/00
[52] U.S. Cl. .................... 239/88; 239/585.1; 239/533.9; 251/129.19; 251/129.16
[58] Field of Search .............................. 239/585.1, 533.8, 239/533.9, 533.2, 88–91; 251/129.16, 129.19; 137/625.48

[56] References Cited

U.S. PATENT DOCUMENTS

| | | | |
|---|---|---|---|
| 2,735,644 | 2/1956 | Bishofberger | 251/77 |
| 3,473,780 | 10/1969 | Harms | 251/76 |
| 3,970,282 | 7/1976 | Hansen | 251/129 |
| 4,008,876 | 2/1977 | Bastle | 251/129 |
| 4,605,197 | 8/1986 | Casey et al. | 251/30.01 |
| 4,666,125 | 5/1987 | Marts et al. | 251/129.19 |
| 4,783,009 | 11/1988 | Coates | 239/580 |
| 5,265,804 | 11/1993 | Brunel | 239/585.1 X |
| 5,499,608 | 3/1996 | Meister et al. | 123/467 |
| 5,538,187 | 7/1996 | Mueller et al. | 239/585.1 X |

FOREIGN PATENT DOCUMENTS

| | | |
|---|---|---|
| 0604914A1 | 12/1993 | European Pat. Off. . |
| 0753658A1 | 7/1996 | European Pat. Off. . |
| 98/25025 | 6/1998 | WIPO . |

*Primary Examiner*—Lesley D. Morris
*Attorney, Agent, or Firm*—Michael B. McNeil

[57] ABSTRACT

A control valve, preferably for use in a fuel injector, includes a valve body that defines a first passage and a second passage. A solenoid is attached to the valve body and has an armature. A multi piece valve member is attached to the armature and is positioned in the valve body. The multi piece valve member is moveable between a first position in which the first passage is open to the second passage, and a second position in which the first passage is closed to the second passage. The multi piece valve member includes a second valve member piece moveable with respect to a first valve member piece between a contact position in which a portion of the second valve member piece is in contact with the first valve member piece, and a separated position in which the portion is a distance away from the first valve member piece. A damping spring is compressed between the second valve member piece and the first valve member piece when the second valve member piece is in its separated position. The damping spring serves to absorb energy that might otherwise reveal itself as bouncing behavior when the valve member comes in contact with one of its stops.

20 Claims, 6 Drawing Sheets

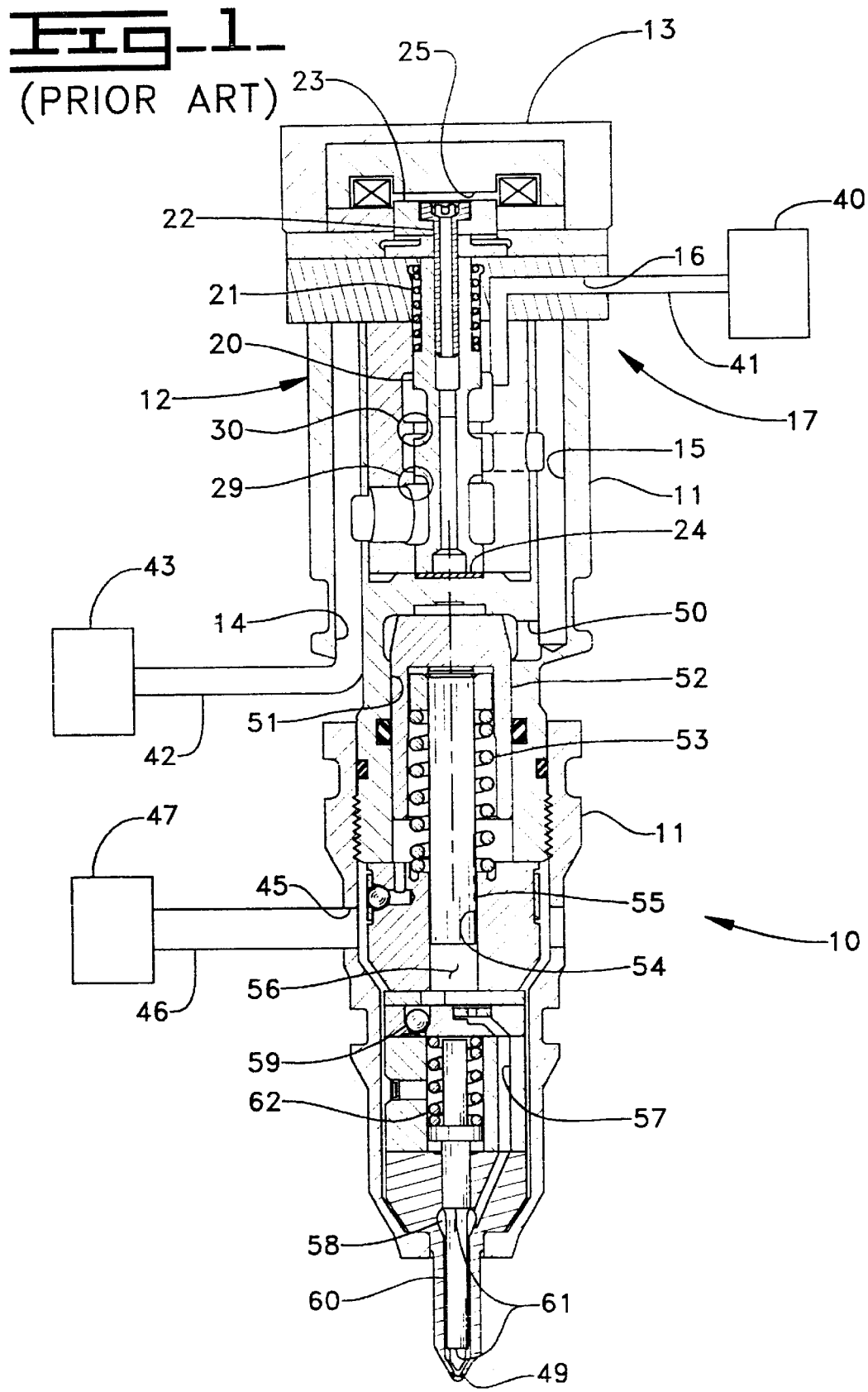
Fig_1
(PRIOR ART)

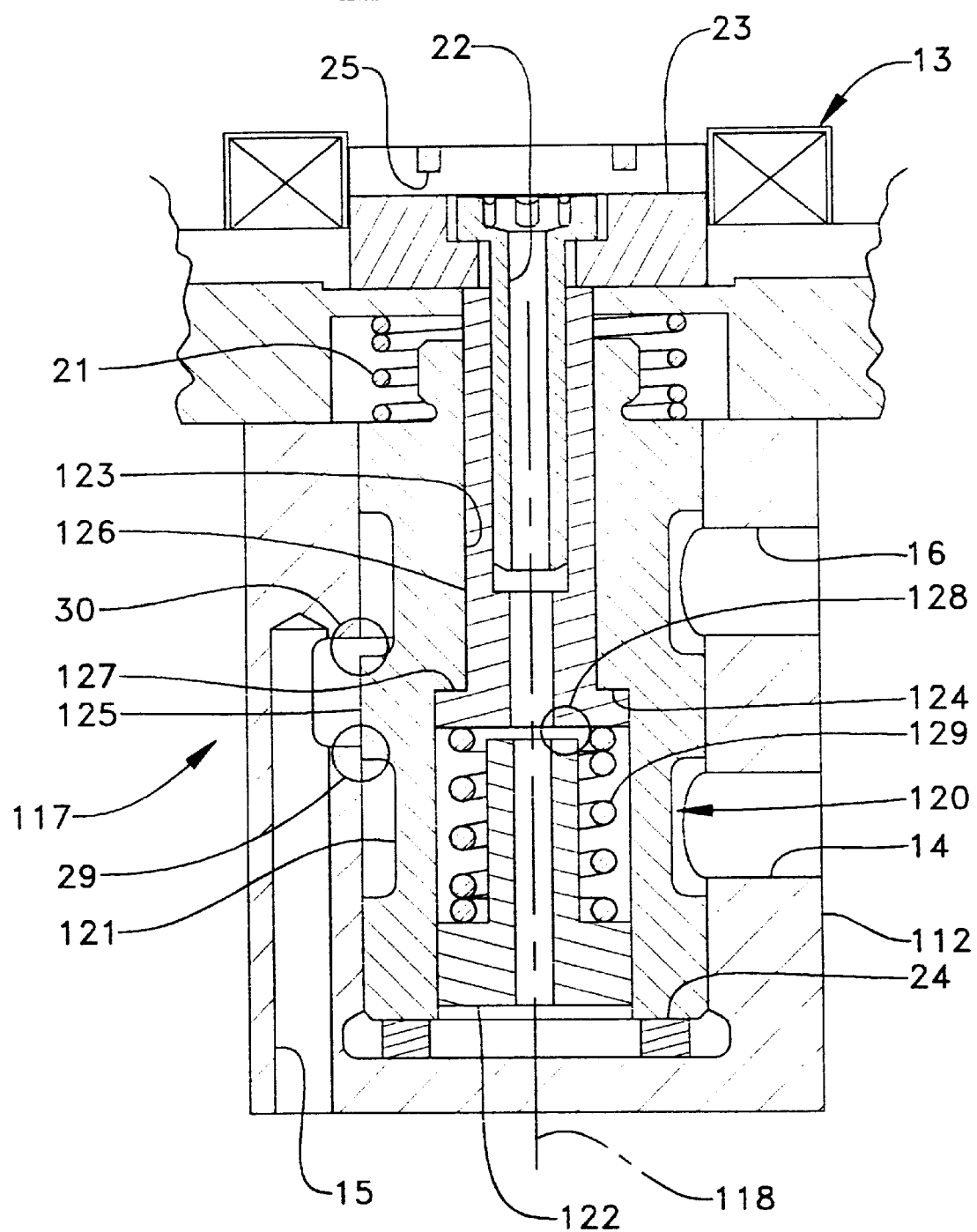
Fig_2_

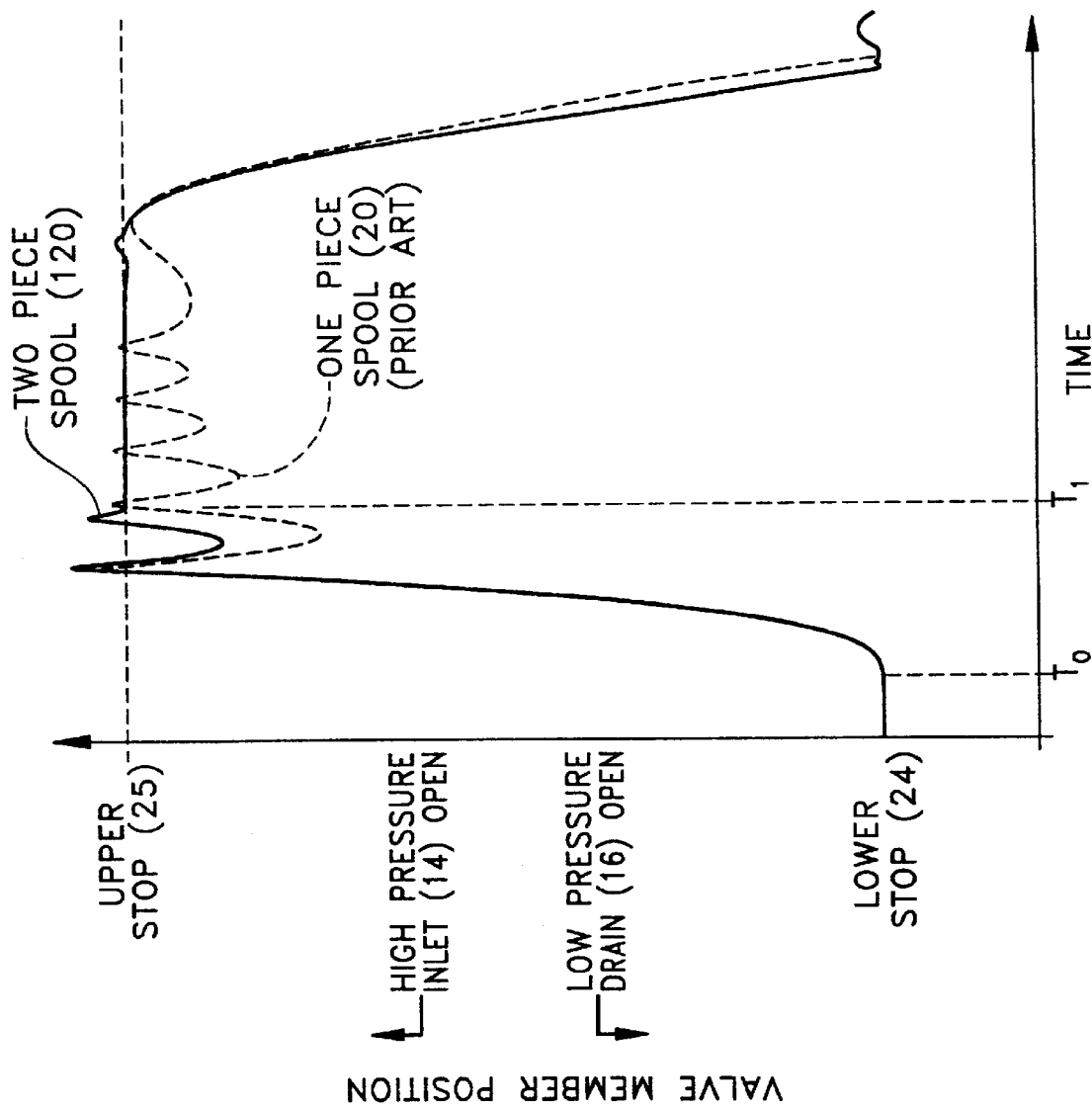

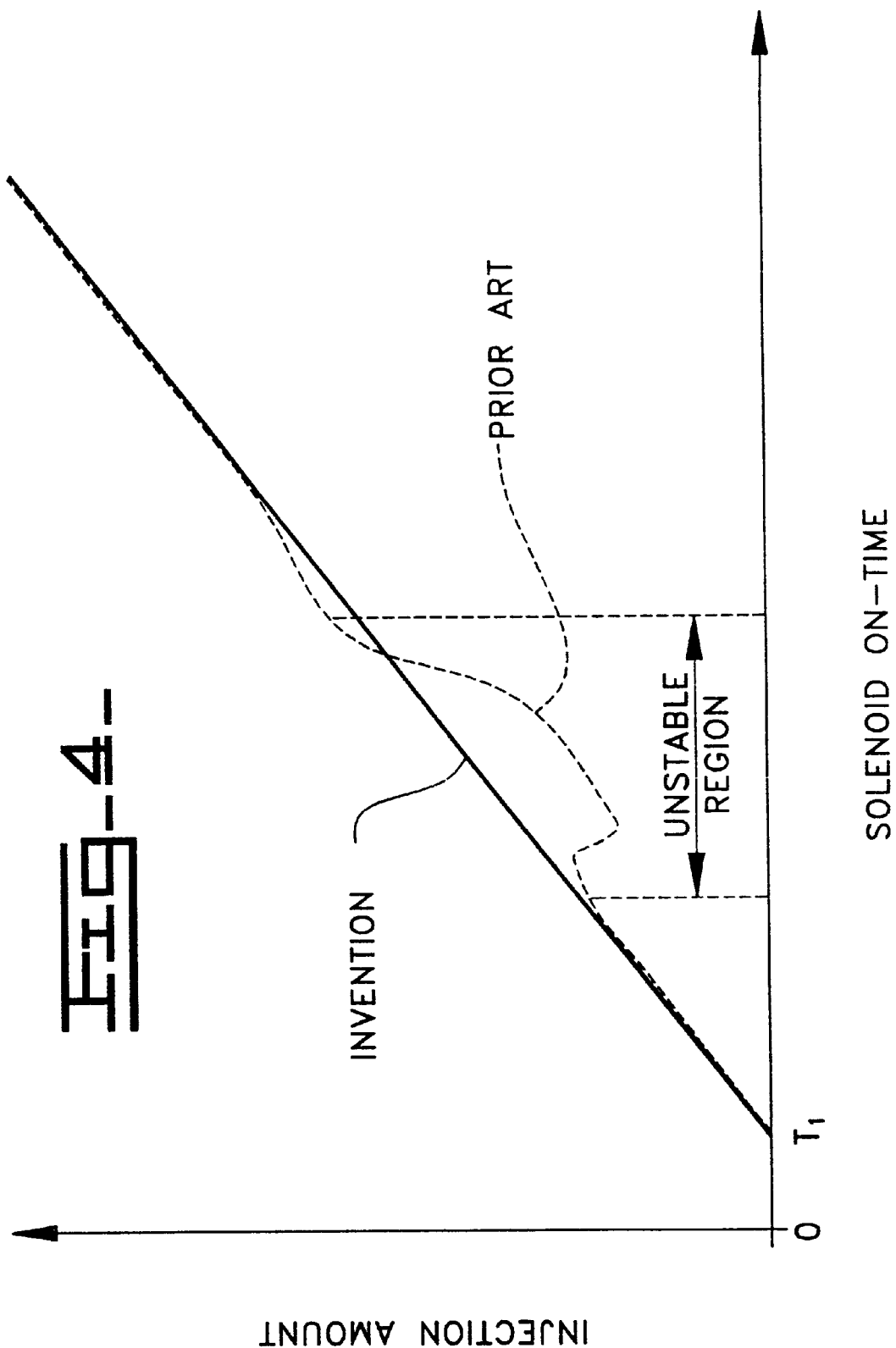

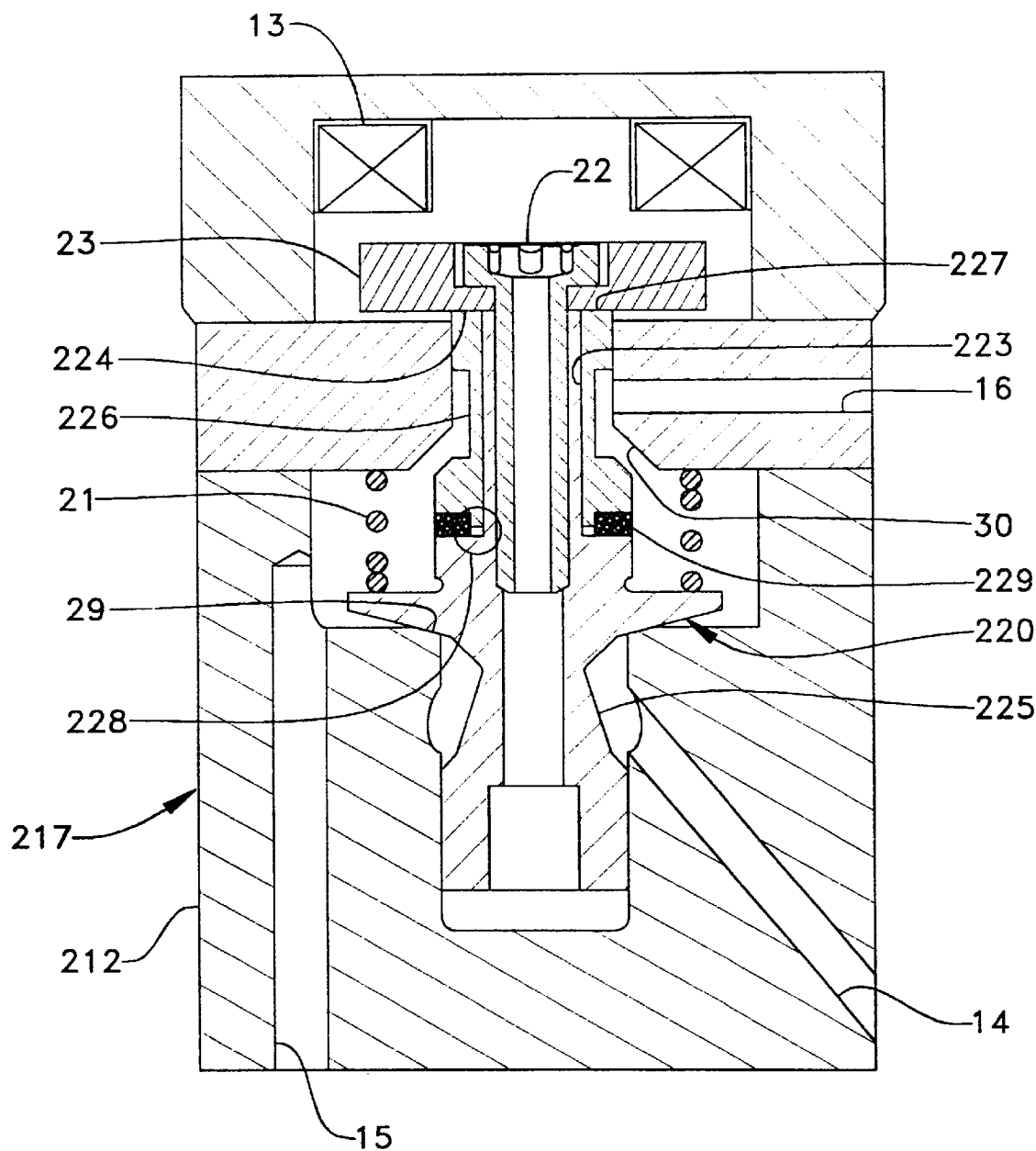
Fig_5_

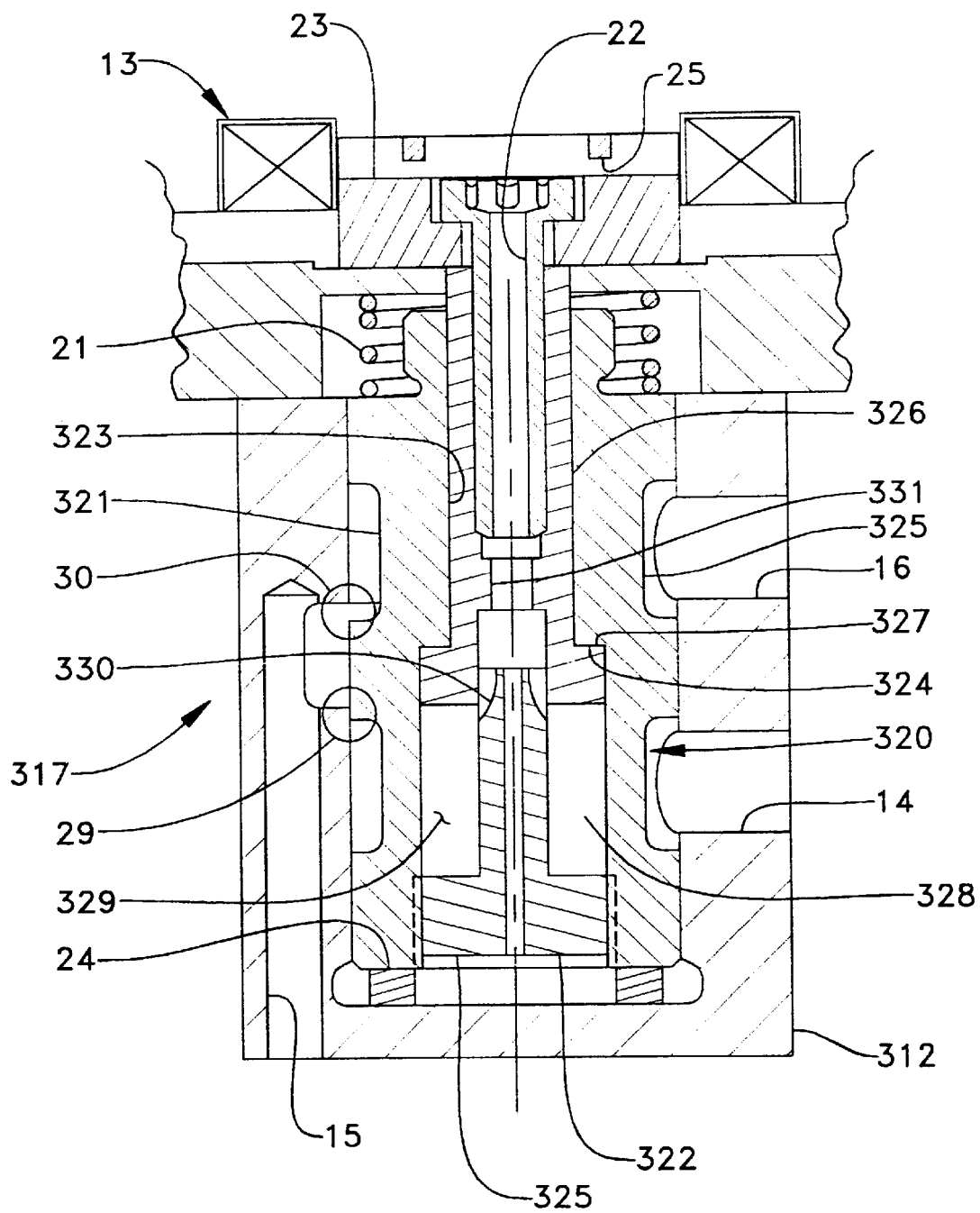

5,967,413

DAMPED SOLENOID ACTUATED VALVE AND FUEL INJECTOR USING SAME

TECHNICAL FIELD

The present invention relates generally to solenoid actuated fluid valves, and more particularly to valve having a multi piece valve member that is damped to reduce bouncing when the valve is actuated.

BACKGROUND ART

Solenoid actuated valves have long been known in a wide variety of arts, especially in applications where valve activation timing and speed are important. One such application includes fuel injectors that utilize solenoid actuated control valves to control the timing and duration of injection events. Typically, these control valves have an internal valve member that is biased to one position between injection events, but is pulled to a second position by the solenoid during an injection event. In most cases, the solenoid is energized for a sufficient amount of time that the valve member comes to rest at its upper stop during the injection event. This is important because valve members often bounce one or more times when coming into contact with their upper stop shortly after the solenoid is energized. In the case of a relatively short injection event, the solenoid can sometimes be de-energized before the valve member has stabilized by coming to rest at its upper stop. When this occurs, the valve tends to behave somewhat erratically since the bouncing may cause the valve member to close faster such that less fuel is actually injected than was expected. This erratic behavior due to valve member bouncing is somewhat unpredictable and nonlinear since engineers have observed that it can vary from injector to injector and also vary from injection event to injection event for a fixed on-time in a single injector. Therefore, in order to achieve reliable and predictable performance, some correcting measures must be taken if the injector is to be operated in the brief on-time range where the bouncing phenomenon occurs.

The present invention is directed to these and other problems associated with valve member bouncing in solenoid actuated valves.

DISCLOSURE OF THE INVENTION

A valve includes a valve body that defines a first passage and a second passage. A solenoid is attached to the valve body and has an armature. A multi piece valve member is attached to the armature and is positioned in the valve body. The multi piece valve member is moveable between a first position in which the first passage is open to the second passage, and a second position in which the first passage is closed to the second passage. The multi piece valve member includes a second valve member piece movable with respect to a first valve member piece between a contact position in which a portion of the second valve member piece is in contact with the first valve member piece, and a separated position in which the portion is a distance away from the first valve member piece. A damping spring is compressed between the second valve member piece and the first valve member piece when the second valve member piece is in its separated position.

BRIEF DESCRIPTION OF THE DRAWINGS

FIG. 1 is a sectioned side diagrammatic view of a hydraulically-actuated fuel injector according to the prior art.

FIG. 2 is a sectioned side diagrammatic view of a control valve according to one embodiment of the present invention.

FIG. 3 is a graph of valve member position versus time for the control valves of FIGS. 1 and 2.

FIG. 4 is a graph of injection amount versus solenoid on-time for a sample fuel injector according to the prior art and present invention.

FIG. 5 is a sectioned side diagrammatic view of a poppet valve embodiment of the present invention.

FIG. 6 is a sectioned side diagrammatic view of a fluid damped spool valve embodiment of the present invention.

BEST MODE FOR CARRYING OUT THE INVENTION

Referring now to FIG. 1, a prior art hydraulically-actuated fuel injector 10 includes an injector body 11, a part of which is a control valve body 12. A solenoid 13 is attached to valve body 12. Valve body 12 defines an actuation fluid inlet passage 14, which is connected to a source of high pressure actuation fluid 43 via a high pressure supply passage 42, an actuation fluid drain passage 16 connected to a drain reservoir 40 via a drain passage 41, and an actuation fluid cavity passage 15 connected to an actuation fluid cavity 50.

Valve body 12 can be considered a portion of a solenoid actuated control valve 17 that includes a control valve member 20 that is connected to an armature 23 via a hollow fastener 22. Control valve member 20 is normally biased downward against its lower stop 24 by a return spring 21 such that actuation fluid cavity passage 15 is open to drain 16 past low pressure seat 30. When solenoid 13 is energized, armature 23 and valve member 20 are lifted upward into contact with upper seat 25, which closes low pressure seat 30 and opens high pressure seat 29. When in this position, actuation fluid cavity passage 15 is opened to actuation fluid inlet 14 past high pressure seat 29.

In addition to the control features just identified, fuel injector 10 includes a means for hydraulically pressurizing fuel that includes a piston bore 51 within which an intensifier piston 52 reciprocates between a retracted position, as shown, and a downward advanced position. Injector body 11 also defines a plunger bore 54, within which a plunger 55 reciprocates between a retracted position, as shown, and a downward advanced position. Both piston 52 and plunger 55 are biased toward their retracted positions by a return spring 53. A portion of plunger bore 54 and plunger 55 define a fuel pressurization chamber 56 that is connected to a nozzle outlet 49 via a nozzle supply passage 57 and a nozzle chamber 58.

Fuel injector 10 also includes a needle valve member 60 that is positioned in nozzle chamber 58. Needle valve member 60 is normally biased downward by a needle biasing spring 62. Needle valve member 60 will move upward to an open position when fuel pressure acting on lifting hydraulic surfaces 61 is above a valve opening pressure sufficient to overcome needle biasing spring 62.

When plunger 55 is undergoing its upward return stroke between injection events, fresh fuel is drawn into fuel pressurization chamber 56 past a check valve 59. Fuel enters injector body 11 at a fuel inlet 45, which is connected to a source of medium pressure fuel 47 via a fuel supply passage 46. Preferably, source 43 of high pressure actuation fluid is a source of high pressure lubricating oil, and fuel source 47 is a source of medium pressure distillate diesel fuel.

Each injection event is initiated when solenoid 13 is energized to lift spool valve member 20 upward to close low pressure seat 30 and open high pressure seat 29. Spool valve member 20 typically moves on the order of hundreds of microns from its lower stop 24 to its upper stop 25. The movement of spool valve member 20 allows high pressure actuation fluid to enter injector body 11 at inlet 14, move past high pressure seat 29 into actuation fluid passage 15, and eventually into actuation fluid cavity 50, where it can act on the upper hydraulic surface of intensifier piston 52. The high pressure acting on intensifier piston 52 quickly overcomes return spring 53 causing both piston 52 and plunger 55 to begin their downward stroke. As plunger 55 moves downward, check valve 59 closes and fuel pressure in fuel pressurization chamber 56 rises. This fuel pressure quickly rises above a fuel pressure necessary to lift needle valve member 60 upward to an open position to allow fuel to commence spraying into the combustion space within the engine through nozzle outlet 49.

Each injection event is ended by de-energizing solenoid 13 so that spool valve member 20 moves downward under the action of spring 21 to open low pressure seat 30 and close high pressure seat 29. This causes a rapid drop in pressure acting on intensifier piston 52, which results in plunger 55 and piston 52 ceasing their downward stroke. This in turn causes fuel pressure in fuel pressurization chamber 56 to drop rapidly below a valve closing pressure sufficient to hold needle valve member 60 open. Needle valve member 60 then moves downward to close nozzle outlet 49 under the action of needle biasing spring 62 to end the injection event.

Referring now in addition to FIGS. 3 and 4, engineers have observed that spool valve member 20 bounces off its upper stop 25 a plurality of times when solenoid 13 is energized. This bouncing phenomenon can undermine injector performance in at least two ways. Firstly, if the spool valve member bounces too far, flow past the high pressure seat 29 can be restricted, or in extreme cases actually briefly closed. This can inhibit the quick build-up of actuation fluid pressure on the top of hydraulic surface of intensifier piston 52. A second and probably more important problem produced by the bouncing phenomenon occurs when the injection event is so short that the solenoid is de-energized before it has stopped bouncing and come to rest at its upper stop. When this occurs, the fuel injector appears to behave somewhat unpredictably because the spool valve is being commanded to move toward its closed position when it is moving either toward or away from its upper stop. FIG. 4 shows that this bouncing phenomenon produces an unstable region where the injection amount is no longer linearly related to the solenoid on-time. Injector performance in the unstable region is even more unpredictable because it has been observed that the shot to shot performance of an individual injector will vary for a fixed on-time in the unstable region, and the performance of different injectors will vary substantially. As a consequence, it can sometimes be relatively difficult to predictably inject an amount of fuel corresponding to the unstable region of the fuel injector's control valve.

Referring now to FIG. 2, a control valve 117 according to the present invention shares many features in common with the prior art control valve 17 illustrated in FIG. 1. These identical features are identified throughout the drawings with the same feature numbers. Thus, the control valve 117 of FIG. 2 could be substituted for the control valve 17 of fuel injector 10 shown in FIG. 1. In order to make the fuel injector perform substantially linearly throughout its operating range as shown in FIG. 4, control valve 117 includes a multi piece valve member 120 instead of the single piece spool valve member 20 of the prior art. The control valve 117 of the present invention is able to perform linearly since the multi bouncing phenomenon of the prior art has been reduced to a single small bounce. Furthermore, the multi piece valve member 120 comes to rest at its upper stop within a relatively short time period $T_1$, which corresponds to the minimum on-time for the solenoid to inject any fuel (see FIG. 4). Thus, a fuel injector using control valve 117 of the present invention is able to perform predictably and substantially linearly throughout its operating range.

Control valve 117 includes a valve body 112 within which is positioned multi piece valve member 120. Multi piece valve member 120 includes a spool piece 125 and a damping piece 126 that are able to move slightly with respect to one another along a common centerline 118. Spool piece 125 includes a spool valve member 121 with an attached threaded plug 122. Spool piece 125 also defines a guide bore 123, within which damping piece 126 is positioned. Damping piece 126 is attached to armature 23 via a hollow screw 22. A damping spring 129 normally biases damping piece 126 toward a contact position with spool piece 125 in which annular shoulder 127 is in contact with annular shoulder 124. Although not essential, damping spring 129 preferably has at least a minimal preload to hold shoulders 124 and 127 in contact. Thus, damping spring 129 is compressed between threaded plug portion 122 of spool piece 125 and damping piece 126. Multi piece valve member 120 is biased downward against lower stop 24, as shown, by return spring 21, which is compressed between spool piece 125 and valve body 112. When in this downward position, high pressure seat 29 is closed and low pressure seat 30 is open.

When solenoid 13 is de-energized, spool piece 125 rests against lower stop 124, the small preload in damping spring 129 maintains annular shoulders 124 and 127 in contact, and a separation distance exists between armature 23 and upper stop 25. When solenoid 13 is energized, armature 23 and multi piece valve member 120 are pulled upward toward upper stop 25. When armature 23 hits upper stop 25, damping piece 126, fastener 22 and armature 23 come to an abrupt stop. However, spool piece 125 continues moving upward such that annular shoulder 124 becomes separated from annular shoulder 127 causing both return spring 21 and damping spring 129 to further compress. Preferably, damping spring 129 provides a significantly larger force on spool piece 125 than that provided by return spring 21, especially when shoulders 124 and 127 are apart. In fact, damping spring 129 preferably produces a large enough force that some separation distance at gap 128 is always maintained between damping piece 126 and spool piece 125. Thus, a majority of the momentum of multi piece valve member 120 is absorbed in damping spring 129 when armature 23 comes in contact with upper stop 25.

When pieces 125 and 126 separate, the high spring force in damping spring 129 quickly reverses the direction of spool piece 125 causing it to again move in the direction of contact between annular shoulders 124 and 127. When the two annular shoulders again come in contact, any energy remaining causes the multi piece valve member 120 to bounce a short distance downward away from upper stop 25 (see FIG. 3). After this brief and relatively small bounce, the multi piece valve member 120 quickly comes to rest in contact with upper stop 25 with annular shoulders 124 and 127 once again in contact with one another. In order to provide the best damping performance, the combined mass of damping piece 126, fastener 22 and armature 23 is made to be about equal to the mass of spool piece 125, which includes spool valve member 121 and threaded plug 122.

When solenoid 13 is de-energized, return spring 21 pushes multi piece valve member 120 back downward toward lower stop 24. Any bouncing phenomenon that might otherwise occur when the valve member comes in contact where the lower stop 24 is damped in a manner similar to that just described with regard to the upper stop 25. However, in this embodiment, bouncing behavior at the lower stop is not as critical since it does not significantly effect the behavior of fuel injector 10.

Referring now to FIG. 5, a control valve 217 according to another embodiment of the present invention takes the form of the multi piece poppet valve member 220 instead of the multi piece spool valve member 120 of the previous embodiment. Furthermore, in this embodiment, damping spring 229 takes the form of a resilient material 229 instead of the coil spring 129 of the previous embodiment. Damping springs 129 and 229 could also be other forms of mechanical springs, such as one or more bellville type washers. In this example, damping spring 229 is preferably a donut shaped piece of relatively hard rubber or other elastomeric material. Like the previous embodiment, damping spring 229 always maintains a separation gap 228 between an upper poppet piece 226 and a lower poppet piece 225.

In this embodiment, armature 23 is attached to lower poppet piece 225 with a fastener 22. A portion of lower poppet piece 225 is positioned within a guide bore 223 defined by upper poppet piece 226. In this embodiment, damping spring 229 preferably includes a preload that urges annular end portion 227 into contact with the underside annular portion 224 of armature 23. This embodiment performs substantially similar to the earlier embodiment as far as damping bouncing behavior, but is different in that the high and low pressure seats 29 and 30 function in this embodiment also as the upper and lower stops for multi piece poppet valve member 220.

Referring now to FIG. 6, a control valve 317 according to still another embodiment of the present invention utilizes a compressed fluid damping spring 329 in place of the mechanical springs of the previous embodiments. In this embodiment, annular volume 328 communicates with fluid displacement passage 331 via a pair of flow orifices 330 that are defined by threaded plug 322 and damping piece 326. Because of flow orifices 330, compressed fluid damping spring 329 has no preload when solenoid 13 is de-energized and return spring 21 has urged spool piece 325 downward into contact with lower stop 24. Thus, there is no preload to maintain annular shoulders 324 and 327 in contact when solenoid 13 is de-energized. When solenoid 13 is energized, multi piece valve member 320 moves upward within valve body 312 to a position where high pressure seat 29 opens, low pressure seat 30 closes and armature 23 contacts upper stop 25. When this occurs, armature 23, fastener 22 and damping piece 326 come to an abrupt stop. Spool valve member 321 and threaded plug 322 of spool piece 325 continue moving upward causing flow orifices 330 to close, and annular shoulders 324 and 327 move apart. When flow orifices 330 close, annular volume 328 becomes a compressed fluid spring 329, because it becomes a trapped volume of fluid. The upward momentum of multi piece valve member 320 is then absorbed by compressed fluid spring 329. This compression of fluid in volume 328 eventually causes spool piece 325 to reverse direction and move downward toward a position where annular shoulders 324 and 327 again come in contact. The damping produced by the exchange of energy between the multi piece valve member 320 and the compressed fluid spring 329 substantially damps the bouncing behavior that would otherwise occur. This embodiment is similar to that of FIG. 2 in that spool piece 325 defines a guide bore 323 within which damping piece 326 moves.

INDUSTRIAL APPLICABILITY

Although the present invention has been illustrated as being used as a control valve in a hydraulically-actuated fuel injector, the present invention could find potential application in a wide variety of fluid control valves for other types of fuel injectors and non-fuel injector technologies, such as anti-lock brake systems. The present invention is particularly applicable to control valves where a bouncing phenomenon is observed within the desired operating range of the valve. When the damping spring of the present invention is designed to have a small preload, the present invention is especially useful in those cases where close timing control of the control valve is desired. This close timing is possible because the multi piece valve member behaves as a single mass when the solenoid is initially energized, and no relative movement within the valve member occurs until it hits its upper stop. Those skilled in the art will appreciate that an adequate amount of damping can be provided in virtually any control valve by converting the valve member to a multi piece valve member and choosing an appropriate material and strength for the damping spring. In some cases it may be desirable to divide the multi piece valve member into three or more pieces and provide two or more damping springs in order to produce some desired performance characteristics.

The above description is intended for illustrative purposes only, and is not intended to limit the scope of the present invention in any way. For instance, the present invention can utilize mechanical and/or fluid springs, and the spool valve member may be broken up into two or more separate pieces that move with respect to one another when the valve member comes in contact with one of its stops. Thus, although the present invention has been illustrated in a variety of embodiments in one specific fuel injector application, the true scope of the present invention should be interpreted in terms of the claims set forth below.

I claim:

1. A valve comprising:
    a valve body defining a first passage and a second passage;
    a solenoid attached to said valve body and having an armature;
    a multi-piece valve member attached to said armature and being positioned in said valve body and being moveable between a first position in which said first passage is open to said second passage, and a second position in which said first passage is closed to said second passage;
    said multi-piece valve member including a second valve member piece moveable with respect to a first valve member piece between a contact position in which a portion of said second valve member piece is in contact with said first valve member piece, and a separated position in which said portion is a distance away from said first valve member piece; and
    a damping spring compressed between said second valve member piece and said first valve member piece when said second valve member piece is in said separated position.

2. The valve of claim 1 wherein said damping spring includes at least one of a mechanical spring and a compressed fluid spring.

3. The valve of claim 1 wherein said damping spring is partially compressed when said first valve member piece and said second valve member piece are in said contact position.

4. The valve of claim 1 further comprising a biasing spring compressed between said valve body and said multi-piece valve member.

5. The valve of claim 1 wherein multi-piece valve member includes a spool valve member.

6. The valve of claim 1 wherein multi-piece valve member includes a poppet valve member.

7. The valve of claim 1 wherein one of said first valve member piece and said second valve member piece moves in a guide bore defined by the other of said first valve member piece and said second valve member piece.

8. The valve of claim 1 wherein said portion of said second valve member piece is an annular shoulder positioned inside said first valve member piece.

9. The valve of claim 1 further comprising a biasing spring compressed between said valve body and said multi-piece valve member;
   said biasing spring producing a relatively small force on said multi-piece valve member; and
   said damping spring producing a relatively large force when said first valve member piece and said second valve member piece are in said separated position.

10. The valve of claim 1 wherein one of said first valve member piece and said second valve member piece is attached to said armature with a fastener; and
    a combined mass of said one, said armature and said fastener is about equal to a mass of the other of said first valve member piece and said second valve member piece.

11. The valve of claim 1 wherein said valve body defines a third passage;
    said first passage being closed to said third passage when said multi-piece valve member is in said first position; and
    said first passage being open to said third passage when said multi-piece valve member is in said second position.

12. A fuel injector comprising:
    an injector body defining a first passage, a second passage and a nozzle outlet;
    a solenoid attached to said injector body and having an armature;
    a multi-piece valve member attached to said armature and being positioned in said injector body and being moveable between a first position in which said first passage is open to said second passage, and a second position in which said first passage is closed to said second passage;
    said multi-piece valve member including a second valve member piece moveable with respect to a first valve member piece between a contact position in which a portion of said second valve member piece is in contact with said first valve member piece, and a separated position in which said portion is a distance away from said first valve member piece; and
    a damping spring compressed between said second valve member piece and said first valve member piece when said second valve member piece is in said separated position.

13. The fuel injector of claim 12 wherein said damping spring is partially compressed when said first valve member piece and said second valve member piece are in said contact position.

14. The fuel injector of claim 13 further comprising a biasing spring compressed between said valve body and said multi-piece valve member.

15. The fuel injector of claim 14 wherein one of said first valve member piece and said second valve member piece moves in a guide bore defined by the other of said first valve member piece and said second valve member piece.

16. The fuel injector of claim 15 wherein one of said first valve member piece and said second valve member piece is attached to said armature with a fastener; and
    a combined mass of said one, said armature and said fastener is about equal to a mass of the other of said first valve member piece and said second valve member piece.

17. A hydraulically actuated fuel injector comprising:
    an injector body defining an actuation fluid inlet, an actuation fluid drain, an actuation fluid cavity and a nozzle outlet;
    a solenoid attached to said injector body and having an armature;
    a multi-piece valve member attached to said armature and being positioned in said injector body and being moveable between a first position and a second position;
    said multi-piece valve member including a second valve member piece moveable with respect to a first valve member piece between a contact position in which a portion of said second valve member piece is in contact with said first valve member piece, and a separated position in which said portion is a distance away from said first valve member piece;
    said actuation fluid cavity being open to said actuation fluid drain but closed to said actuation fluid inlet when said multi-piece valve member is in said first position;
    said actuation fluid cavity being closed to said actuation fluid drain but open to said actuation fluid inlet when said multi-piece valve member is in said second position;
    a damping spring compressed between said second valve member piece and said first valve member piece when said second valve member piece is in said separated position.

18. The hydraulically actuated fuel injector of claim 17 wherein said injector body defines a fuel inlet connected to a source of fuel; and
    said actuation fluid inlet is connected to source of actuation fluid that is different from said fuel.

19. The hydraulically actuated fuel injector of claim 17 wherein said wherein said multi-piece valve member includes a spool valve member.

20. The hydraulically actuated fuel injector of claim 17 wherein said multi-piece valve member includes a poppet valve member.

* * * * *